United States Patent

Miyasaka et al.

[11] Patent Number: 5,555,349
[45] Date of Patent: Sep. 10, 1996

[54] PRINTING DEVICE AND RECORDING PAPER CONTROL

[75] Inventors: Masayo Miyasaka; Yoshikazu Ito; Masahiro Minowa; Kazunari Yawata, all of Suwa, Japan

[73] Assignee: Seiko Epson Corporation, Tokyo, Japan

[21] Appl. No.: 397,009

[22] Filed: Mar. 1, 1995

Related U.S. Application Data

[63] Continuation of Ser. No. 139,627, Oct. 20, 1993, Pat. No. 5,437,004, which is a continuation of Ser. No. 902,318, Jun. 22, 1992, abandoned.

[51] Int. Cl.$^6$ ................................................. G06K 15/00
[52] U.S. Cl. ............................................. 395/111; 358/498
[58] Field of Search ............................. 395/111, 113, 395/105, 101, 114; 358/498; 355/300, 308, 309, 311, 313, 314, 317; 346/134, 136; 271/226, 227, 229; 400/595–596

[56] References Cited

U.S. PATENT DOCUMENTS

| | | | |
|---|---|---|---|
| 4,614,949 | 9/1986 | Hakkaku et al. | 346/76 PH |
| 4,933,772 | 6/1990 | Ikenoue et al. | 358/300 |
| 4,939,554 | 7/1990 | Hirabayashi et al. | 355/317 |
| 4,998,216 | 3/1991 | Hino et al. | 364/519 |
| 5,075,874 | 12/1991 | Steeves et al. | 395/112 |

FOREIGN PATENT DOCUMENTS

| | | |
|---|---|---|
| 027561 | 4/1981 | European Pat. Off. . |
| 3516374 | 11/1985 | Germany . |
| 59067 | 12/1990 | Japan . |

Primary Examiner—Arthur G. Evans
Attorney, Agent, or Firm—Eric B. Janofsky

[57] ABSTRACT

A printing device and control method that facilitates setting of waiting periods for cut-sheet paper insertion and commencement of paper transport or printing through application of waiting time control commands. By establishing a command for setting these waiting periods and incorporating apparatus in the printer for analyzing such a command, a configuration is realized in which these waiting periods are settable and adjustable by the host computer. This provides more efficient POS type printer control and allows setting of the desired time required for positioning recording paper according to operator experience. An interface unit is used to receive and interpret print data and recording paper positioning time setting commands and data from the host computer. The received commands and data are temporarily stored in a data memory, and after insertion of the recording paper is detected, used by one or more timing circuits to wait for a set amount of time before transport of or printing on the cut-sheet paper is initiated by a printing mechanism controller, during which time paper positioning is confirmed.

7 Claims, 5 Drawing Sheets

PRINTING DEVICE AND RECORDING PAPER CONTROL

This is a continuation of prior application Ser. No. 08/139,627 filed on Oct. 20, 1993 now U.S. Pat. No. 5,437,004, which is a continuation of Ser. No. 07/902,318 filed on Jun. 22, 1992 which is now abandoned.

BACKGROUND OF THE INVENTION

1. Field of the Invention

The present invention generally relates to printing devices operating in conjunction with host computers and more particularly to printers connected to a host computer that provide output in response to commands from the host computer. The invention further relates to point-of-sale type printers capable of printing on cut-sheet type paper.

2. Related Technology

A variety of small specialized printers have been developed and widely used with host computers and other apparatus for printing data associated with point-of-sale (POS) transactions. A common example of such a printer application is for a department store where such printers are used to generate a "tape" style purchase receipt on "recording paper" for a customer which lists the items purchased as well as taxes and other fees levied against the transaction and a total balance due. These printers are used as part of the so called cash or check-out "register" commonly seen throughout retail business. In addition to the recording paper, these printers are also generally required to generate a "journal" or "journal tape" on a roll of paper for permanently recording and verifying the transactions for the particular sales register. The printing devices used for these kinds of transactions generally transported a recording paper material, typically from a roll of paper, along a preset paper path through a printing mechanism where a print head forms the output image. More recently, due to the nature of record keeping and the sales transactions themselves, single or "cut-sheet" paper has found use in sales transactions. Additional information, business logos, instructions, or terms and conditions of the sale are now included as part of the transaction receipt, or specialized transaction forms, such as for "credit" transactions, are used. Therefore, many POS printers are configured with an insertion or access slot to provide access for insertion of individual cut-sheet paper or forms into the paper path for the printing mechanism.

In any case, POS printers are currently configured to begin printing immediately, when a switch is activated by an operator, or within a set elapsed time after it is determined that paper has been inserted into the mechanism, particularly cut-sheet paper. Since the time it takes to position recording paper in POS printers, and the like, varies according to operator skill or experience, this currently gives rise to two inefficient conditions. First, an operator may be required to wait until the end of an allotted elapsed time interval even after the recording paper is positioned within the printer. Second, once the recording paper is detected, regardless of whether or not correctly positioned, it is transported into or through the printer before being correctly positioned, often causing problems.

On the other hand, if a maximum waiting time for insertion of recording paper is not set, the host computer will wait indefinitely until it receives information from the printing device regarding insertion of the recording paper, also resulting in lost time. At the same time, if an operator mistakenly sets the printer in a cut-sheet paper printing mode, it is sometimes necessary to turn off the power to the printer to escape this mode, which also resets other settings.

What is needed is a method and apparatus for setting and changing waiting times for paper insertion, positioning, and transport which can flexibly account for the skill of the operator. Something is needed to optimize the allocation of time for POS paper insertion activities while facilitating host control through application of new transport control commands.

SUMMARY

In order to solve these and other problems, one purpose of the present invention is to provide a printing device that optimizes the waiting interval for recording paper insertion;

Another purpose is to facilitate user control of the cut-sheet paper waiting time by means of control a command.

Yet another purpose of the invention is to allow the time interval between recording paper insertion and transport to be selectively set, generally using host computer commands.

An advantage of the present invention is that it optimizes recording paper control in a printing device.

Another advantage of the present invention is that it realizes efficient data transfer and optimization of commands by facilitating setting of the recording paper insertion wait time and the recording paper positioning time with the same command.

These and other purposes, objects, and advantages are realized in a printing device having a printing section with a printer head for printing on cut-sheet and other types of recording paper, and a paper transport mechanism for moving paper adjacent to and past the print head in the printing section. A paper detector is used to detect when recording paper is inserted in the printing device and a timing unit connected to the detector and transport mechanism is used to start paper transport when a first predetermined time interval for positioning of recording paper has elapsed after detection of the paper. A positioning or position control element is used to variably set a desired first time interval. In the preferred embodiment, the printing device also uses an insertion or insertion control element to variably set a second time interval as a maximum wait time for recording paper insertion. A warning or error detection unit produces an error signal if no recording paper is detected within the second time interval.

In further aspects of the invention, the timing element uses at least a first and second timers to count the first and second time intervals, respectively. An interface unit is connected to a host computer to receive commands from a set of predefined commands, print data, and other data strings. A data analyzer interprets or decodes the received data and commands, at least one of which is at least one time setting command for setting the length of at least the first time interval, and generally also setting the length of time for the second interval. Preferably a single command is used to set the first and second time intervals, and it typically comprises a two-byte length command parameter set with one byte used as a command parameter indicating the first time interval and the second byte used as a command parameter indicating the second time interval.

A data storage or memory element is used for storing analyzed data which indicates at least the first time interval as specified by the time setting command and provides this data to the timers for measuring the specified time periods. A print controller activates the first of the two timers after recording paper is detected, confirms the detection of the recording paper and paper position, and initiates paper transport and printing.

The paper transport mechanism has a transport section open-close mechanism configured to be electrically operated to open and close a recording paper transfer path and a recording paper transport roller, and a recording paper transport controller to confirm the positioning of the recording paper, and then operates the transport section open-close mechanism, holding the recording paper so that it can be transported, and driving the recording paper transport roller.

The data storage or memory is configured as a first memory unit in which data, command parameters, defining the first time interval as specified by the time setting command is stored, and a second memory unit in which data defining the second time interval is stored. The first and second timers use the data from the first and second memory units to measure elapsed times for paper positioning after insertion before commencing printing or transport, and for waiting insertion. A first activation element starts the second timer after waiting for recording paper insertion and confirms whether or not the recording paper was inserted within the specified wait time, and a second activation element starts the first timer so as to measure the elapsed recording paper positioning time. A timer controller having a calculation element can be used to calculate elapsed times for at least the first time interval based on stored parameters and detector output. A confirmation element checks whether or not recording paper has been inserted within the calculated wait time.

The method of operation includes selecting a length of at least the first time interval for paper positioning, detecting the presence or absence of paper inserted in the printing device, measuring the first time interval beginning with detection of paper, and initiating paper transport through the printing section after passage of the time interval, provided paper has been detected. In further embodiments, the length of the second time interval defining a maximum time period allowed for paper insertion in selected and an error signal is produced when no paper is detected within said second time interval.

Using the invention, it is possible to set both a waiting time for insertion of paper and a desired time interval between when the recording paper is detected until transport commences, thus facilitating selection of the recording paper positioning time according to the skill of printer device operators in the POS field. Furthermore, where multiple cash registers are connected to a host computer, the recording paper positioning time can be set in advance for each individual cash register.

BRIEF DESCRIPTION OF THE DRAWINGS

The novel features of the invention may be better understood from a review of the following description when taken in conjunction with the accompanying drawings, in which like numbers refer to like parts and in which.

DETAILED DESCRIPTION OF PREFERRED EMBODIMENTS

The present invention provides a method and apparatus for controlling selection of waiting time or intervals for recording paper insertion and positioning within a printing device. The printing device is configured to respond to commands and data from a host computer and allow selective control over these intervals for optimizing performance according to operator experience and other factors.

Figure 4:
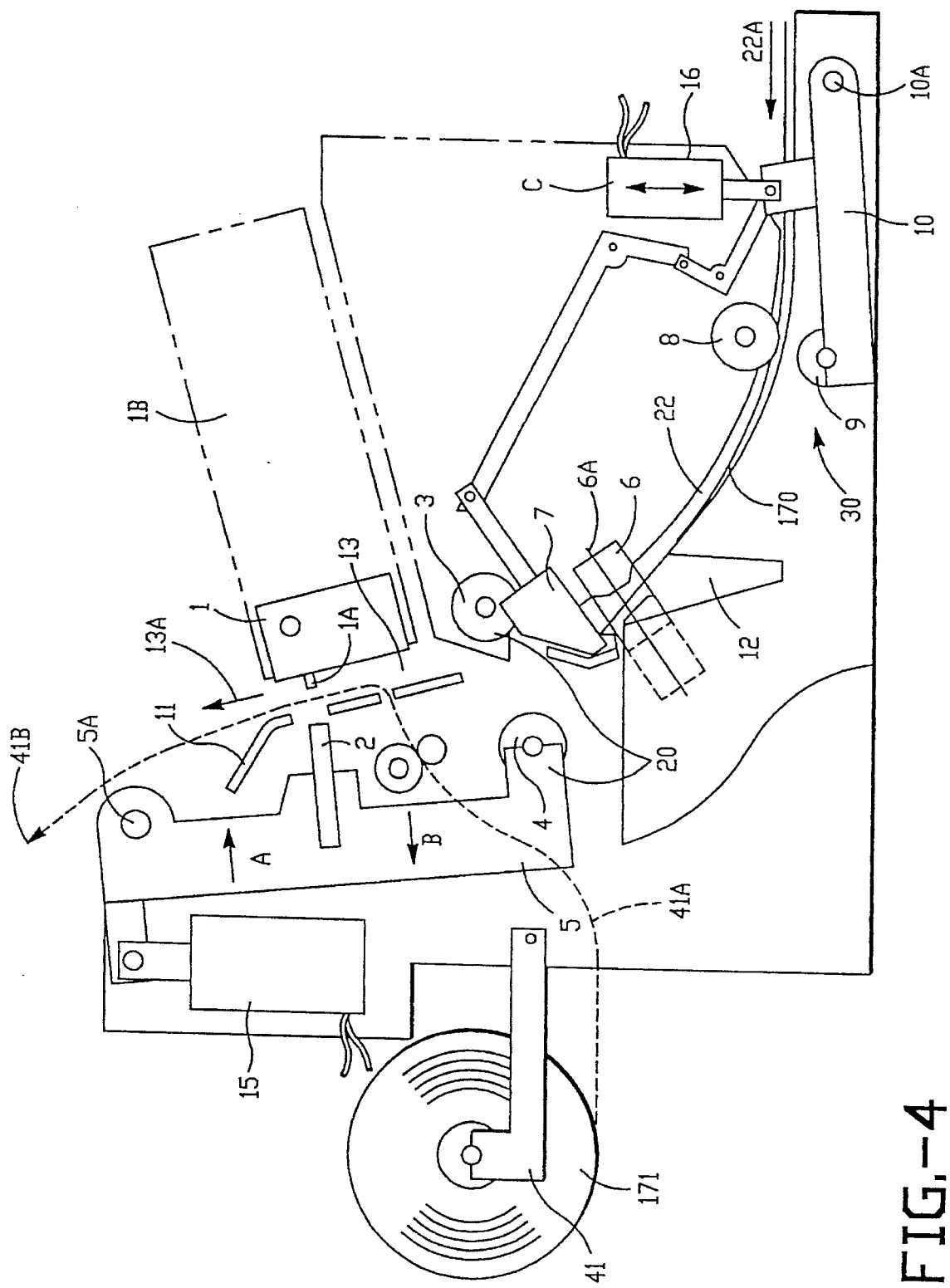
FIG. 4 illustrates a simplified diagram of one embodiment of the printing device mechanism of the invention.

A simplified cross section of one embodiment of the mechanical portion of a printing device constructed and operating according to the principles of the invention is illustrated in FIG. 4. Additional descriptions of this type of printing device are also found in copending U.S. patent application Ser. No. 07/507,319 owned by the same assignee, and incorporated herein by reference. This embodiment has a mechanism capable of printing on at least two types of recording paper, i.e., roll paper and cut-sheet paper. Cut-sheet paper is indicated in FIG. 4 by the numeral designation 170 and roll paper is indicated by 171.

In FIG. 4, the mechanical portion of a printing device is shown using a print head 1 having print wire pins 1A (only one shown), and an ink ribbon 1B. A platen 2 is mounted opposite print wire pins 1A on a support or support frame 5 so that it is movable back and forth along the directions indicated by arrows A and B. This movement is accomplished by pivoting support 5 about a shaft 5A using a plunger 15 connected to the support. A recording paper drive roller 3 and an opposing auxiliary roller 4, which is positioned on the support 5, are pressed together to provide friction feeding pressure on recording paper 170 disposed between the rollers. Plunger 15 and support member 5 form the principal constituent parts of a printing section open-close or engage-disengage mechanism, which opens and closes over the paper as appropriate. Along with drive and auxiliary rollers 3 and 4, respectively, this structure also constitutes a recording paper transport section 20 for the printing device.

A recording paper drive roller 8, in conjunction with an auxiliary roller 9 pressed against it, is also used for transporting recording paper 170. Auxiliary roller 9 is positioned so that it is supported by a support arm 10 and can be rotated along the direction of arrow C by being pivoted on a pivot point 10A by a plunger 16. Plunger 16, auxiliary roller 9, and support arm 10 form the principal components of a transport section open-close or engage-disengage mechanism, which in conjunction with drive and auxiliary rollers 8 and 9, constitutes a recording paper transport section 30. A recording paper guide plate 11 establishes an upper paper transport path 13 for recording paper 170 adjacent to print head 1.

Cut-sheet paper is generally divided into standard size validation cards and "slip paper" which can be easily copied or duplicated. A frame notch 12 is typically positioned along the periphery of validation cards for positioning, and generally has a structure that allows lateral insertion, from the side of printing devices, for standard sized cards.

Also shown in FIG. 4, is a type of photosensor 6, having an optical axis 6a, for the recording paper detection element that detects insertion of recording paper, and a stop element or stopper 7 for assisting in the guiding and alignment of cut-sheet paper during insertion. Stop 7 is linked to plunger 16 and is disposed along a lower paper path 22 so that it is movable across the paper path to selectively block or open and close the recording paper path.

Cut-sheet paper 170 is inserted from or along the direction indicated by arrow 22A and is considered positioned in recording paper path 22 when it strikes against stop 7. The presence of recording paper 170 in this position is detected by the fact it crosses or blocks optical axis 6A of photosensor 6, thus changing the amplitude of light received by a detector. When paper is detected, plunger 16 is retracted moving support arm 10 about pivot 10A, which closes recording paper transport section 30, and presses rollers 8 and 9 against opposite sides of recording paper 170. At this point, stop 7 is also moved out of recording paper path 22, typically using a series of lever arms or gears connected to plunger 16, which opens the recording paper path allowing recording paper 170 to be transported to a printing position by drive and auxiliary rollers 8 and 9. When recording paper 170 is transported to the printing position, plunger 15 is retracted to facilitate further recording paper transport by the drive and auxiliary rollers 3 and 4.

The cut-sheet paper is positioned by correctly pushing it against stop 7, when it is in the "pull-in" position across paper path 22. This allows accurate transport of the recording paper. As previously mentioned, the time it takes to correctly position the recording paper differs among printing device operators according to their relative level of experience, among other factors., and there are cases in which problems arise if recording paper transport is begun immediately after insertion is detected. Therefore, the preferred embodiment of the present invention controls the printing device as described below.

As an alternative to cut-sheet paper, a roll paper holder 41 holds roll paper 171, as seen in FIG. 4, which is ejected from the printing mechanism along the direction indicated by arrow 41B and dotted line 41A.

Figures 3, 6:
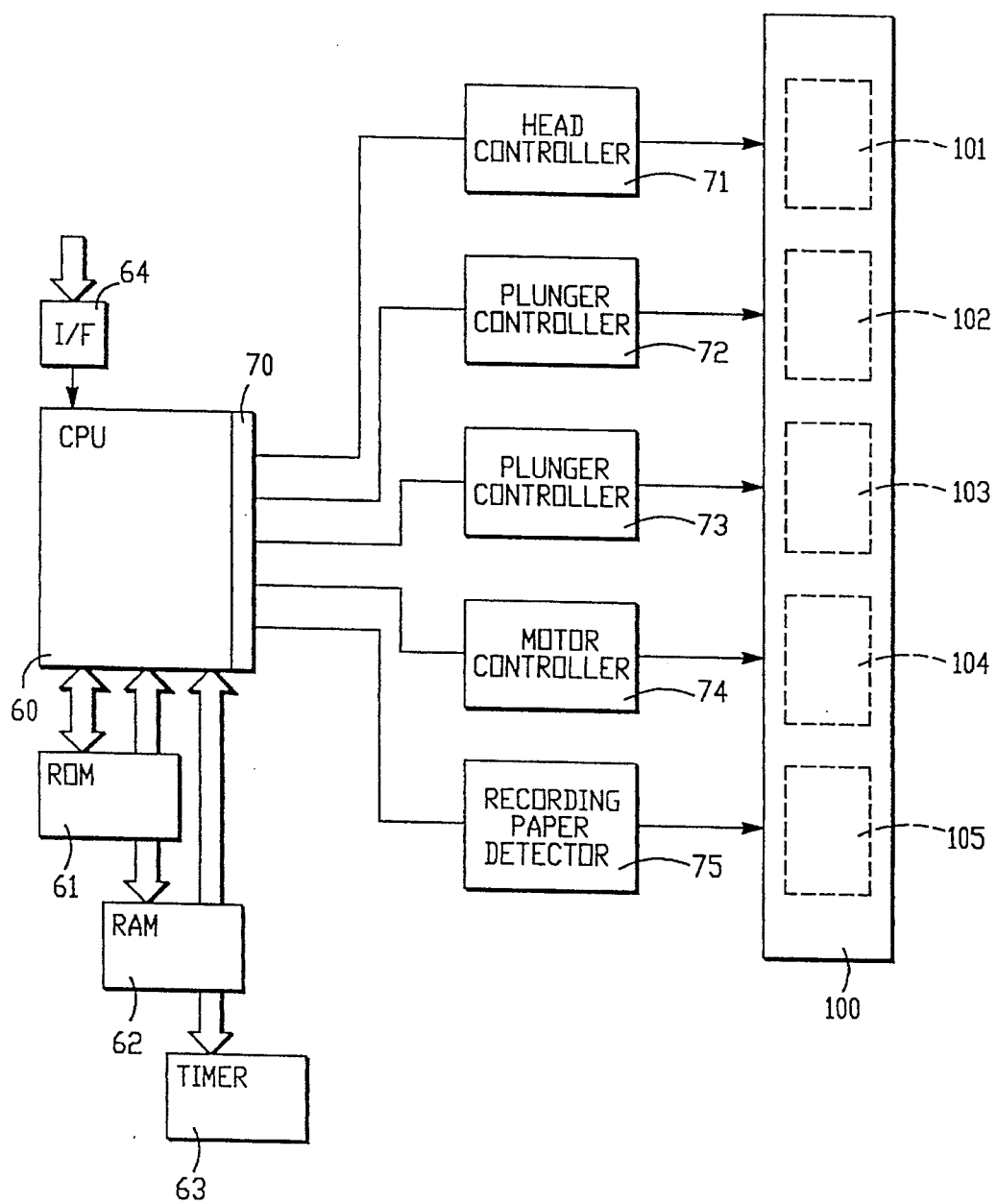
FIG. 3 illustrates a block diagram of a control circuit for a printing device mechanism constructed and operating according to the principles of the invention.
FIG. 6 illustrates an embodiment of the command structure used to implement the invention.

A block diagram of an exemplary controller found useful for controlling the printing device mechanism described above is presented in FIG. 3. In FIG. 3, a printing device mechanism 100 is shown using a print head 101, plungers 102 and 103, which correspond to 15 and 16 above, a motor 104 that serves as the drive source for recording paper transport, and a recording paper detector 105. A central processing unit (CPU) 60 performs general control of the entire printing device using a ROM 61 to store programs or instructions, etc., that analyze and execute all device and control commands sent from the host computer and are used as part of the control method for the invention. In addition, a RAM 62 is also connected to CPU 60 for temporarily storing data, along with a timer 63 for measuring certain prescribed time periods, and an interface or control command receiver 64 for receiving input print data and commands from the host computer.

Central processing unit 60 uses an I/O port 70 for communicating with various elements in the printing device which it is controlling. Exemplary elements connected to CPU 60 I/O port 70 include a print head controller 71, plunger controllers 72 and 73, a motor controller 74, and a recording paper detection circuit 75. Detection circuit 75 is also connected to recording paper detector 105, which detects the presence or absence of recording paper in the transport path.

CPU 60 receives data from or through interface 64, and while analyzing this data, controls printing device mechanism 100 based on that data so that prescribed printing operations are executed. That is, CPU 60 prepares printer data, generally the letters and numbers to be printed, by interpreting input data and separates out commands from the print data.

Figure 1:
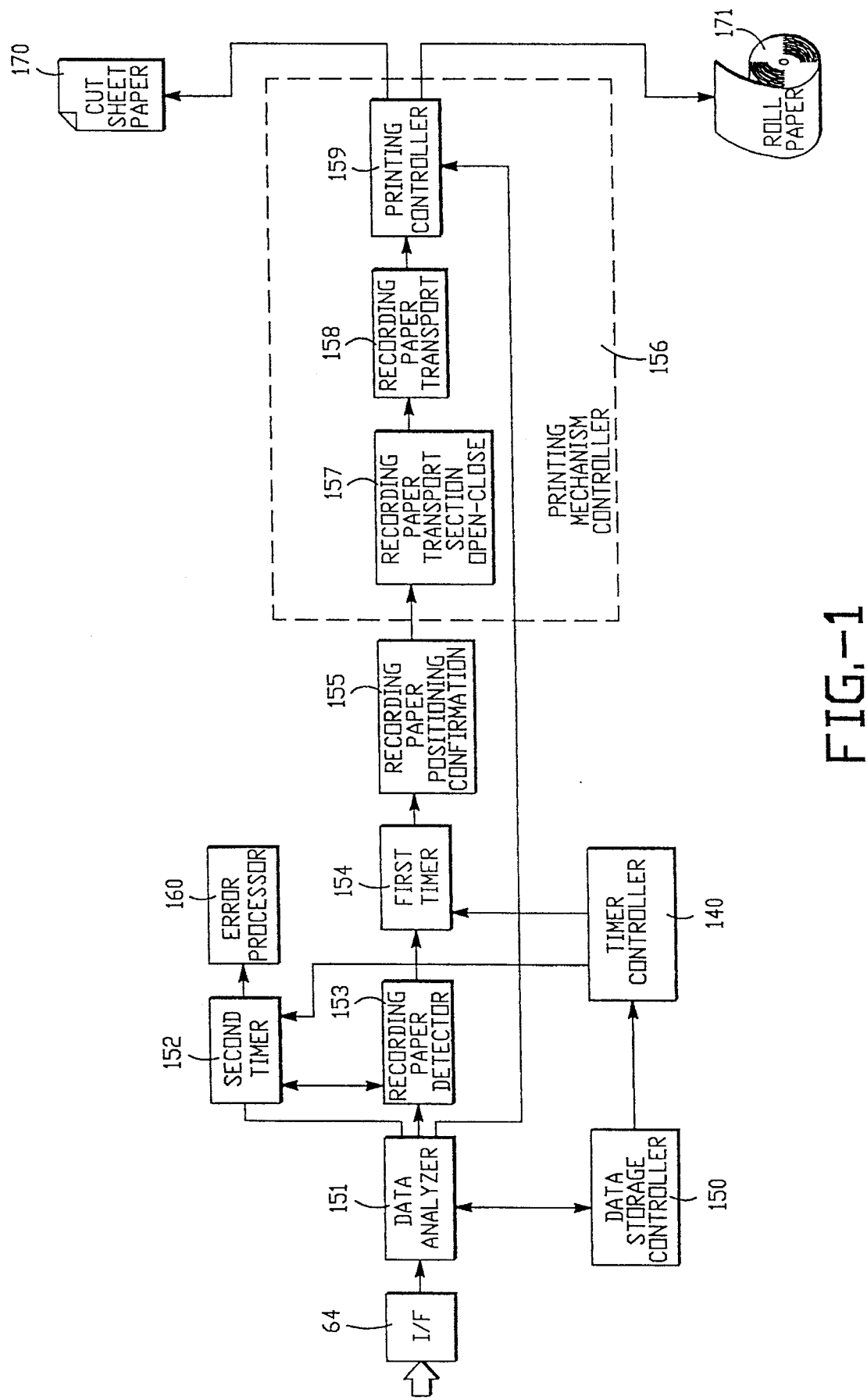
FIG. 1 illustrates a function block diagram of one embodiment of the present invention.

Functional operations for the invention are illustrated in the block diagram of FIG. 1. In FIG. 1, data transferred to input interface 64 is analyzed or interpreted by a data analyzer 151 and the results stored in a preselected area or address range in RAM 62, acting as a transient memory unit, using a data storage controller 150. If time setting commands for either a cut-sheet paper positioning period or interval, or a recording paper insertion wait interval are contained in the input data, the interpreted interval values are also temporarily stored in RAM 62. When the input data contains print data, such as characters or numbers, which are to be printed on cut-sheet paper, in response to print commands, then the printer, or CPU 60, waits for insertion of recording paper before printing is commenced.

However, if a maximum time interval for waiting for recording paper insertion is set at this point by a time setting command, then the prescribed parameters or limits for this time interval are retrieved or read out by data storage controller 150 and converted to time data, that is, start and stop times etc., by a timer controller 140 which generally includes a calculation element. A timer 152, referred to as a "second" timer because of its relationship to the printing sequence, is then activated and set to count an "insertion wait" time interval based on this data. A recording paper detector or detection unit 153 waits for, or seeks to detect, insertion of the recording paper while second timer 152 is activated and counting. When insertion of recording paper is detected, a first timer 154 retrieves or recalls positioning wait time interval data previously set by the paper positioning time setting command from data storage. This data is also converted to time data by timer controller 140, and then used to set prescribed time interval to be measured by timer 154.

Timer 152 measures the waiting time set by the host computer for cut-sheet paper insertion while timer 154 measures paper positioning wait time or pause interval set for starting operation after paper insertion. The parameters for these intervals are provided by the host computer, unless a default value is used, and stored in RAM 62, along with other data as required, until needed. A timer or timing circuits built into CPU 60 is generally used for implementing the timers, which can include the application of software timers as desired.

A recording paper positioning confirmation unit 155 confirms whether or not recording paper is correctly positioned after the preselected paper positioning time interval has elapsed, and if so printing control is transferred to printing mechanism controller 156. Printing mechanism controller 156 comprises a recording paper transport section open-close mechanism 157, recording paper transportor 158, and a printing controller 159, which act to sequentially transport and print data on cut-sheet paper 170. Otherwise, if no recording paper is detected after a time interval selected by second timer 152 elapses, then a warning indicator, light, buzzer, or similar annunciation or attention seeking element is activated or generated by error processor 160 to indicate a recording paper positioning error to a printing device operator. At the same time, the error can be recorded as error detection data in memory along with operator identification or other relevant information to track historical efficiency patterns.

If no setting for recording paper insertion wait or positioning time intervals are made by one or more appropriate commands, a set of default values are provided which are then used. While similar to the previously discussed fixed intervals, these period represent settings that are flexible and can be readjusted or set using appropriate host computer commands, at any time. At the same time, the more complicated positioning process needed for recording paper 170 is not normally required for roll paper 171, and printing is executed directly from data analyzer 151 via printing controller 159.

Figure 5:
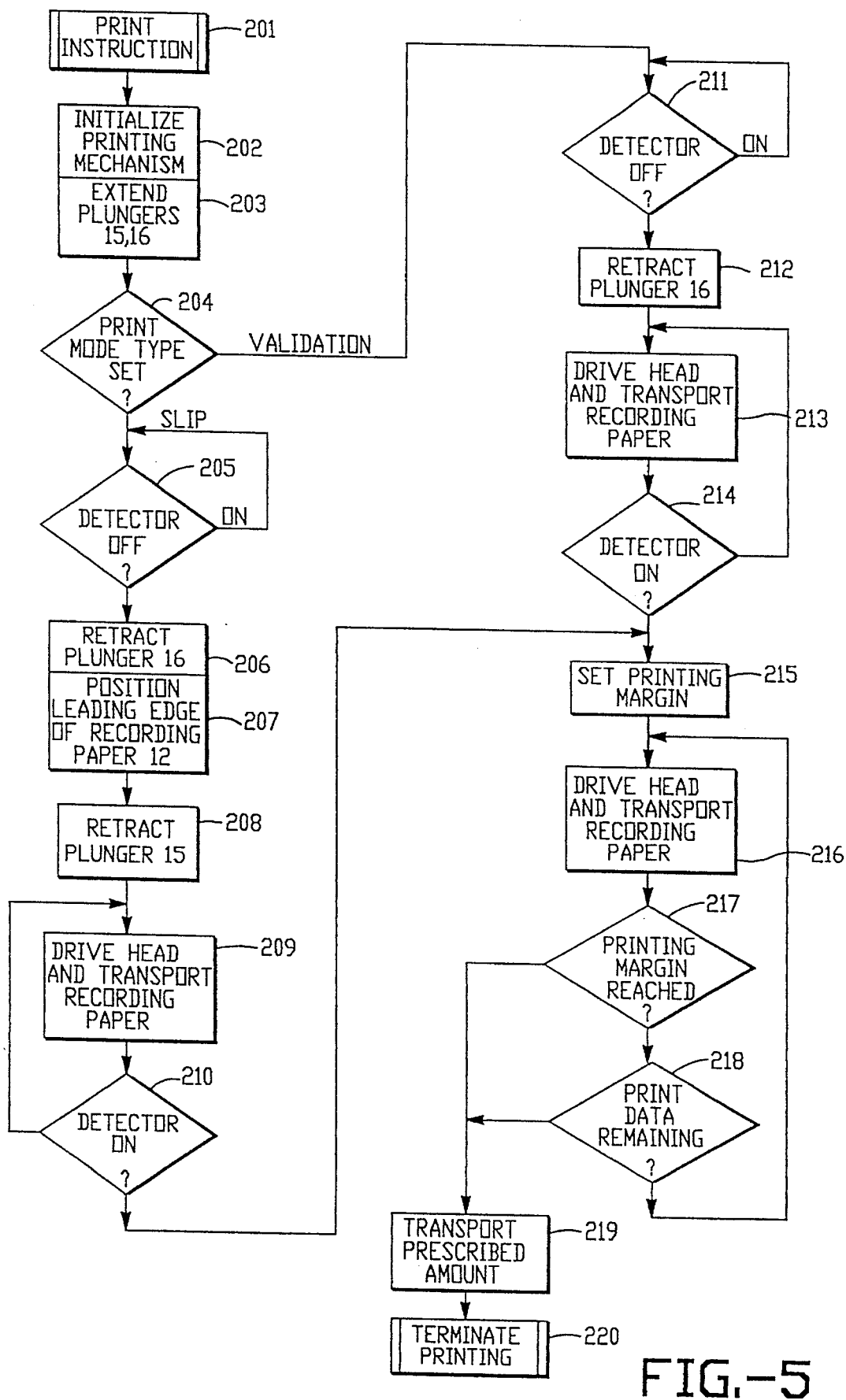
FIG. 5 illustrates a flowchart of the overall process followed by the control method of the present invention.

A flowchart of the overall process steps executed by the control method of the invention is illustrated in FIG. 5, in relation to printing on cut-sheet paper. In FIG. 5, print instructions are received in a step 201, while print data is stored in RAM 61, substantially at the same time. Initialization of the printing device mechanism is then executed in step 202, and plungers 15 and 16 are extended to open the printing section and recording paper path in a step 203. In a step 204, which type of printing mode has been set or selected is detected. That is, it is determined which type of recording paper is to be used, either cut-sheet or slip type paper on the one hand, or validation paper on the other. If slip mode is found to be selected in step 204 then the printing process proceeds to a step 205 for typically used slip paper. Otherwise, if validation mode was selected in step 204 the process proceeds to a step 211 for validation paper.

When slip mode is selected, the output level of detector 6 is checked in a step 205 to determine whether or not recording paper has been positioned in the printing mechanism. If paper is positioned in the printer, the optical beam used by the detector is blocked and the output of detector 6 (see FIG. 4) changes accordingly. In the preferred embodiment, interruption of the optical light source generates an "OFF" condition or state in detector 6. Therefore, the printer waits in the initial paper insertion (wait time) mode until detector 6 switches OFF. After detector 6 switches OFF, plunger 16 is retracted in a step 206 and form stop or stopper 7 is released and moved out of paper path 13, thus allowing the recording paper to be transported at the appropriate time.

Recording paper 170 is then transported in a step 207 to the printing section where the leading edge of the recording paper is positioned relative to the print head. Then, plunger 15 is retracted in a step 208, which closes the printing section and enables printing. At the same time that the printer head is driven (printing) and recording paper is being transported (step 209), the point at which the end of slip or recording paper 170 passes the detector is determined in a step 210. The length of paper that has passed the detector is measured. When detector 6 changes to an "ON" state, that is, paper 170 is no longer present in the optical path of the detector, a predetermined length of paper is transported through the printer until a predicted margin position is reached. The amount or length of recording paper required for a desired minimum remaining printing margin, blank line, is stored at a preselected address in memory in a step 215, here illustrated as RAM, and is used in conjunction with the measured length of paper passing detector 6 to perform a calculation in synchronization with transport of the recording paper to determine when the margin is reached and printing should end. The printing device print head is driven using input print data and recording paper is transported in front of the print head until either the end of the print data or the printing margin is reached (steps 216, 217, 218). In a step 219, the recording paper is transported a prescribed amount and in a step 220 the printing operation is terminated.

In the same manner as in the slip mode, the printer device pauses in validation mode until recording paper has been positioned in a step 211, and once it has been positioned, plunger 15 is retracted in a step 212. Stop 7 has a structure that does not require retraction of plunger 16 since it does not regulate validation cards when inserted from the top or side of the printing mechanism, which also allows their easy removal. The structure of such as stop 7 is described in more detail elsewhere such as in the co-pending U.S. patent application discussed above. Normally, control over positioning of the leading edge of the recording paper is not required in validation mode. Validation cards use dimensions that automatically align or position an appropriate printing region of the card adjacent to the print head when the paper is inserted all the way to the bottom of notch 12, and transport is only executed by the amount of the recording paper transport code contained in the print data. In steps 213 and 214, delivery of print data to the print head and recording paper transport are repeated or continued until detector 6 switches ON. The remaining steps of the validation mode process are the same as in those of the slip mode.

Figure 2:
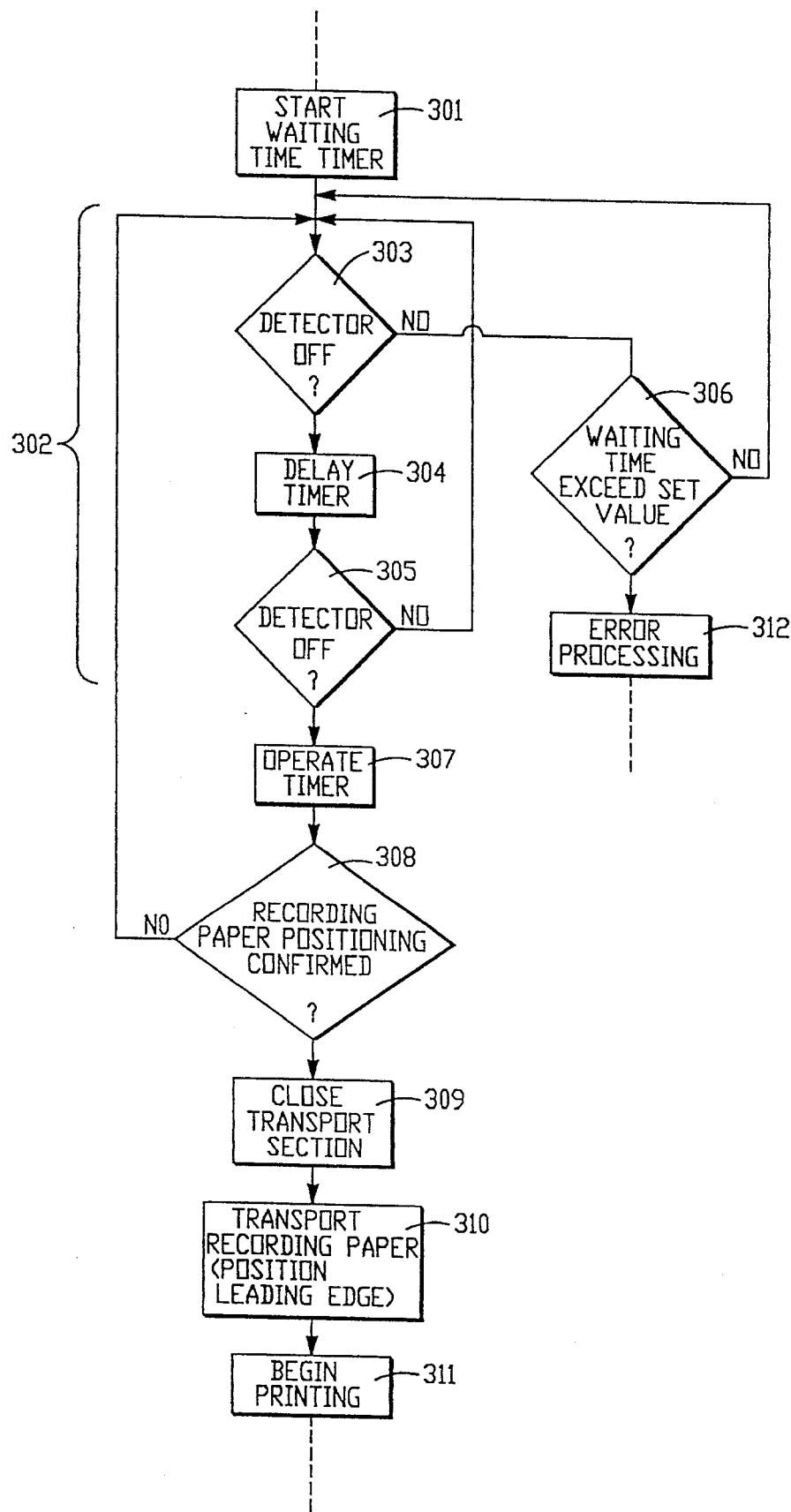
FIG. 2 illustrates a flowchart of the recording paper positioning process used for the invention.

A flowchart for steps 205 and 211 of FIG. 5, as used in the recording paper positioning process of the invention, are described in further detail in FIG. 2. As seen in FIG. 2, after a print instruction, initialization of the printing device mechanism is executed and waiting interval timer is started in step 301 to measure the maximum time to wait for insertion of recording paper. This is the activation of the second timer 152 discussed above.

The paper insertion detector is checked and its status confirmed in a step 302 to see if it has entered the OFF state, thus, indicating insertion of recording paper. Once the detector is checked in substep 303 of step 302, an OFF state or condition for the detector is confirmed by checking its status again in a step 305, but after a delay time of several milliseconds has been implemented in step 304. These delay time and confirmation steps are used to prevent printer device mis-operation due to transient detector noise or errors which briefly and incorrectly indicate paper insertion. After the status of the detector is confirmed as OFF, i.e., insertion of recording paper is confirmed, another timer is activated or operated in a step 307 and reconfirmation of the recording paper is executed to establish that the recording paper has been positioned in step 308. Step 308 details activation of the first timer (154) as described earlier, which allows for confirmation prior to commencement of paper transport.

After recording paper positioning of is completed, control of the printing device mechanism begins, and the open-close mechanism for the recording paper transport section is operated and moved to the closed position in a step 309. The recording paper is then transported to a printing position with a leading edge appropriately positioned in a step 310 adjacent to the printing head. When the recording paper is positioned in the desired printing position, the prescribed printing operations are then executed in a step 311. When validation paper is used, the leading edge positioning process for the recording paper (see step 310) is not executed.

When the waiting time exceeds the time as prescribed in step 301, printing is disabled and the appropriate warning message or indication provided, or other system action taken (step 312), to warn a printing device operator of an error in processing.

During operation of the above timers, a sufficient period of time is allocated for an operator to correctly position recording paper in the prescribed recording paper position of the printing mechanism. The length of this waiting period is conveniently set by preselected commands from the host computer.

An example of a command structure found useful for implementing the present invention is shown in FIG. 6. In FIG. 6, a command 401 for setting a waiting interval or period of time for insertion of the recording paper and an appropriate pause or period of time before recording paper transport occurs or printing begins after insertion, i.e., recording paper positioning time, is shown. It should be noted that a single command or different commands can be used to set these two intervals.

The command code structure of command 401 is preferably sub-divided into at least three portions. The first portion of command 401 is "ESC f", which is a or command designation used to indicate the type of command. That is, what the remainder of the parameters in the command are being provided for or what operation they are associated with. This type of command designation fits into a preselected or defined list of printer commands commonly used in the art, which are readily generated and interpreted by host computers for operating printer mechanisms. Those skilled in the art will be familiar with working with and recognizing this type of command designation or structure.

In the preferred embodiment, "ESC f" is defined or interpreted as a cut-sheet paper waiting time setting command, and when this code is read by the command analyzer, it is interpreted as both a recording paper insertion wait time and positioning time setting command, depending upon parameters provided with the remainder of the command.

A first parameter 402 is illustrated by the letter "m" and indicates a desired setting for the recording paper insertion wait time and, for example, is typically set in increments of one minute each. Therefore, in this embodiment parameter 402 is set as a total of m minutes. A second parameter 403 is illustrated by the letter "n" and indicates a desired setting for the positioning wait interval from when insertion is detected until transport of, or printing on, the recording paper begins. This time interval, for example, is set in increments of one-tenth second each. Therefore, in this embodiment, parameter 403 is set as a total of n×0.1 seconds. In this embodiment, if m is set equal to 5 and n is set equal to 10, then the waiting times for cut-sheet paper insertion is 5 minutes and starting operation is 1 second, respectively.

However, those skilled in the art will readily recognize that other time intervals as best suited to particular application or hardware can be used within the teachings of the present invention. The intervals indicated by these parameters are determined by criteria established in advance by the calculation element, connected to or part of the CPU, and are measured using the appropriate timer. Preferred default values for these parameters are m=0, infinite waiting time, and n=10.

The times indicated by the parameters or factors m and n in the waiting time control command are interpreted or detected by data or command analyzer 151 and temporarily stored by memory controller 150 in RAM 62 for later retrieval by the corresponding timers. These command parameters are typically each configured using one byte of information for a two-byte command parameter length, but two or more bytes can be used as desired.

As described above, using the inventive configuration allows selection of two or more recording paper wait time intervals (insertion and positioning), thus facilitating establishment of wait intervals according to operator experience and contributing to improved work efficiency. The ability to tailor wait times according to operator experience makes them extremely useful. Furthermore, since these times or intervals are settable or selected by one or more host computer commands, they are also settable independently for each site; e.g., it can be set according to the experience of register operators in locations where there are many registers lined up in a row, such as in a supermarket.

Setting the minimum and maximum recording paper insertion wait times, allows the host computer to perform other operations without having to wait indefinitely for insertion of the recording paper, even if not inserted, thus improving the operating efficiency of the computer when many POS terminals are controlled by one host computer. In addition, when insertion of the recording paper is late or delayed, warnings can be generated and other processing performed while a response is pending. The recording paper insertion wait and recording paper positioning times can both be set with the same command, thus offering greater convenience in program control by a host computer.

Since the waiting time for cut-sheet paper can be controlled by a control command, even if a user enters the cut-sheet paper mode by mistake, if a waiting time for cut-sheet paper has been set, the mode can be escaped from after the set time elapses by sending a control command from the host computer. No operator switch operation is required to re-start operation, and even if the cut-sheet paper is inserted incorrectly, if a waiting time for starting operation has been set, the paper can be re-inserted correctly before the set time elapses.

What has been described is a new technique for controlling a printing device such as a POS-type printer which allows more efficient use of wait intervals for paper insertion and transport.

The foregoing description of a preferred embodiment was presented for purposes of illustration and description. It is not intended to be exhaustive nor to limit the invention to the precise form disclosed, and many modifications and variations are possible in light of the above teaching. For example, other time intervals may be selected or the tiers implemented using software generated timers or delay elements instead of a timer built into the CPU. The embodiment was chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What is claimed is:

1. A method of controlling printing on cut-sheet type paper in a printing device, comprising the steps off receiving from a host computer a first predetermined time parameter representing a first duration which the printer will not print to allow for paper positioning;

detecting by the printing device the presence or absence of the paper inserted in the printing device;

measuring by the printing device a first time interval beginning with when the presence of the paper is detected;

reconfirming by the printing device the presence of the paper after said measuring step; and initiating paper transport through a printing mechanism that prints a desired output on the paper when the first time interval exceeds the first duration and when the paper is reconfirmed in said reconfirmation step.

2. The printing control method of claim 1 further comprising the steps of:

selecting the length of a second time interval that defines a maximum time period allowed for paper insertion;

detecting the presence or absence of paper inserted in the printing device while measuring said second time interval; and producing an error signal when no paper is detected within said second time interval.

3. The printing control method of claim 1 further comprising the steps of:

confirming the presence or absence of recording paper after said first time interval has elapsed; and transporting the recording paper for printing when it is determined that paper is present.

4. The printing control method of claim 3 wherein the steps of detecting the presence or absence of paper and measuring said first time interval are repeated when no paper is detected as being present.

5. The printing control method of claim 1 further comprising the steps of:

receiving various predefined command data, print data, and other data strings from a host computer at least one command being a time setting command for setting the length of said first time interval;

interpreting the received data and commands;

storing interpreted data indicating the length of at least said first time interval as specified by a time setting command; and measuring a first time period specified by stored command data.

6. The printing control method of claim 5 wherein said step of storing comprises the steps of:

storing data defining the length of said first time interval as specified by the time setting command in a first memory location;

storing data defining the length of said second time interval as specified by the time setting command in a second memory location; and further comprising the steps of:

starting a timer for measuring elapsed time for insertion of paper based on the data stored in the second memory location;

detecting whether or not the recording paper is inserted during said second time interval; and starting another timer for measuring elapsed time based on the data stored in the first memory location upon paper detection.

7. A method of controlling printing on cut-sheet type paper in a printing device, comprising the steps of:

receiving from a host computer a first predetermined time parameter representing a first duration during which the printer will not print to allow for paper positioning;

manually inserting the paper in the printing device;

detecting by the printing device the presence or absence of the paper inserted in the printing device;

measuring by the printing device a first time interval beginning with when the presence of the paper is detected;

reconfirming by the printing device the presence of paper after said measuring step; and initiating paper transport through a printing mechanism that prints a desired output on the paper when the first time interval is greater than the first duration.

* * * * *